Figure 1:
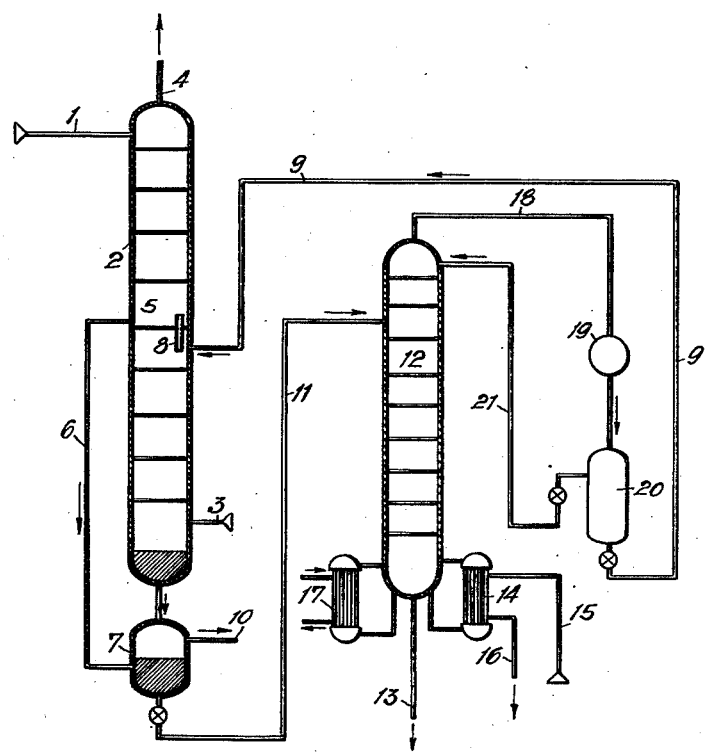
Figure 2:
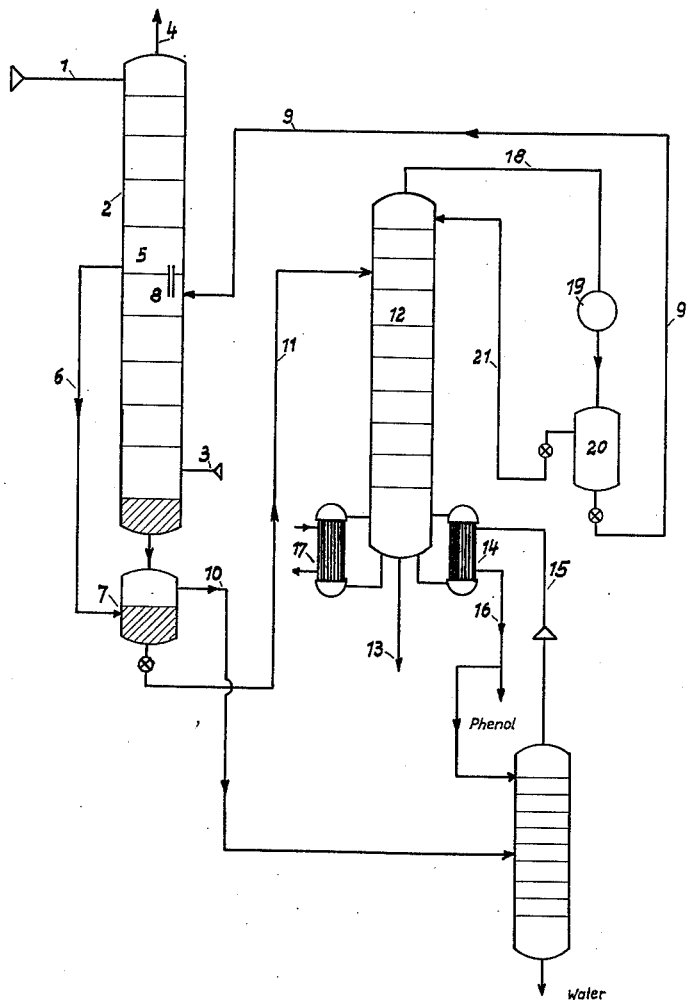

Dec. 3, 1957 J. GELLER ET AL 2,815,389
DISTILLATION OF PHENOL FROM AQUEOUS PHENOLATES
Filed Sept. 15, 1951 2 Sheets-Sheet 1

Fig. I.

INVENTORS
JULIUS GELLER
HEINRICH RATTE
BY
ATTORNEY.

Dec. 3, 1957  J. GELLER ET AL  2,815,389
DISTILLATION OF PHENOL FROM AQUEOUS PHENOLATES
Filed Sept. 15, 1951  2 Sheets-Sheet 2

INVENTORS:
JULIUS GELLER
HEINRICH RATTE
ATTORNEY

United States Patent Office 2,815,389
Patented Dec. 3, 1957

2,815,389

DISTILLATION OF PHENOL FROM AQUEOUS PHENOLATES

Julius Geller, Bad Homburg, and Heinrich Ratte, Frankfurt am Main, Germany, assignors to Rütgerswerke-Aktiengesellschaft, Frankfurt am Main, Germany Application September 15, 1951, Serial No. 246,736

Claims priority, application Germany September 28, 1950

1 Claim. (Cl. 260—627)

It is a known practice to remove phenol and its homologues from common salt solutions, soda solutions or other salt solutions by passing the salt solution containing phenol into an upper tray of a distillation column and distilling the phenol off together with a larger quantity of water. The removal of the phenol is greatly facilitated by the presence of the salt but nevertheless requires a great deal of heat. Furthermore the phenol is present in the distillate water in a small concentration only, so that removal of the water is extremely costly. For this reason, although the possibility of dephenolation of salt solutions by distillation was known, it has been the general practice, in the recovery of phenol from lignite tar and coal tar, to refrain from extracting phenol from the soda solution and to subject the soda solution containing dissolved phenol directly to caustification. This not only causes larger quantities of caustic soda solution to be kept in circulation in the phenol plant, but also causes losses of phenol in the lime sludge and increases the losses of caustic soda solution in the lime sludge.

Generally, in addition to the installation for obtaining watery crude phenol there is also an installation for dehydration and distillation of phenol. In recovering pure phenol by distillation, which is desirable for many reasons, it is necessary to operate with a large reflux ratio. Therefore, with condensation of reflux and distillate at a temperature of 120 to 140° C., if vacuum distillation is being effected, a large amount of heat is available. It has now been found that the heat required for distillation of the phenol-containing soda solution in the dephenolation column, can be made very much less if in the known process of removal of phenols by distillation the sump of the column is heated wholly or partly by the heat of condensation of the phenol vapours from a phenol distillation column. Part of the mixture of water and phenol passing over at the head of the dephenolation column is returned as reflux to the dephenolation column. To avoid the need for separate treatment of the distillate, which contains only up to about 10% of phenol, according to a further feature of the invention this distillate is added, at an intermediate stage in the previous process of saturation with carbon dioxide of the sodium phenolate, to the phenol phase which still contains a proportion of sodium phenolate and from which the salt phase with the water has been previously drawn off.

The invention is revealed in further detail in the following description of an example of treatment of phenolate with reference to the accompanying drawings which diagrammatically illustrates one example of an installation for treatment according to the invention.

Through a pipe 1 watery sodium phenolate passes to the saturating column 2 which is here shown as being in continuous operation. The phenolate flows from tray to tray down the column in counter-current with carbon dioxide, introduced through a pipe 3, of which the residual gases escape through a pipe 4. On a central tray 5 of saturating column 2, where the sodium phenolate has already been largely converted into soda and phenol by the action of the carbonic acid, the soda solution is drawn off, through a pipe 6, from the phenol phase containing unconverted phenolate, and passes directly to a separator 7. The phenol from tray 5 with the still unconverted phenolate is mixed, on a tray 8, with the phenol-containing water, introduced through a pipe 9, from container 20. On its way from the tray 8 to the bottom of the saturation column and the separator 7 the remaining phenolate is converted to phenol and soda under the action of the carbonic acid. Through a pipe 10 the watery phenol is removed for further saturation by means of sulphuric acid and subsequent dehydration and distillation. The soda solution passes through a pipe 11 to the dephenolation column 12, from the foot of which a phenol-free solution is drawn off through a pipe 13; from this solution caustic soda solution is obtained by caustification.

A large proportion of the heat required for the distillation of the phenol-containing soda solution, is supplied by a boiler 14, which is heated by introducing into it through pipe 15 the phenol vapours from the phenol distillation column (not shown). The phenol vapors are condensed in boiler 14 and the condensate is withdrawn and passed on through pipe 16 to the reflux container of the phenol distillation column. The rest of the heat necessary for the dephenolation column is supplied by a boiler 17 heated by steam.

Phenol vapor from the head of the dephenolation column, accompanied by a larger quantity of water vapor equal for instance to four times the quantity of phenol, is removed through a pipe 18 and condensed and cooled in a cooler 19 and the condensate passes to a reflux container 20 from which a part thereof is returned to the head of the dephenolation column 12 through pipe 21 while the remaining amount passes through pipe 9 to the above-mentioned tray 8 of the saturation column.

We claim:

A method for the continuous recovery of phenol from aqueous salt solutions containing the same, comprising (a) subjecting an aqueous alkali phenolate solution in counter-current to the action of gaseous $CO_2$ in a saturating column, discharging solution in which the sodium phenolate has already been largely converted into soda, at a middle section of said column, and introducing the discharged solution into a separator; (b) discharging at the bottom of the saturating column an aqueous liquid containing sodium carbonate and phenol, into said separator, in which a lower mainly salt-containing layer and an upper phenol containing layer are formed; (c) introducing said lower layer from the separator into a dephenolation step of fractional distillation and introducing said upper layer into a fractionation step for separation into phenol vapor and a substantially phenol-free water residue and supplying heat to the dephenolation step by indirect heating with the phenol vapors resulting from this step; (d) introducing part of the phenol-water distillate from the dephenolation step into the saturating column near below the middle level at which solution is discharged from the saturating column.

References Cited in the file of this patent
UNITED STATES PATENTS

| | | |
|---|---|---|
| 1,213,142 | Aylsworth | Jan. 23, 1917 |
| 1,715,313 | Suida | May 28, 1929 |
| 1,944,681 | Cooper | Jan. 23, 1934 |
| 2,391,839 | Magin et al. | Dec. 25, 1945 |
| 2,510,548 | Brunjes | June 6, 1950 |
| 2,573,244 | Bogart et al. | Oct. 30, 1951 |